(12) United States Patent
Chan et al.

(10) Patent No.: US 9,546,912 B2
(45) Date of Patent: Jan. 17, 2017

(54) TIME TEMPERATURE INDICATOR BY CHROMATOGRAPHY AND PHOTONIC LATTICE CHANGES

(71) Applicant: NANO AND ADVANCED MATERIALS INSTITUTE LIMITED, Hong Kong (CN)

(72) Inventors: Po Shan Chan, Hong Kong (CN); Kai Ming Yeung, Hong Kong (CN); Mui Chan, Hong Kong (CN); Sin Man Lee, Hong Kong (CN)

(73) Assignee: NANO AND ADVANCED MATERIALS INSTITUTE LIMITED, Hong Kong (CN)

( * ) Notice: Subject to any disclaimer, the term of this patent is extended or adjusted under 35 U.S.C. 154(b) by 483 days.

(21) Appl. No.: 13/711,170

(22) Filed: Dec. 11, 2012

(65) Prior Publication Data

US 2013/0148690 A1     Jun. 13, 2013

Related U.S. Application Data

(60) Provisional application No. 61/630,480, filed on Dec. 13, 2011.

(51) Int. Cl.
*G01K 3/00*     (2006.01)
*G01K 3/04*     (2006.01)

(52) U.S. Cl.
CPC ..................................... *G01K 3/04* (2013.01)

(58) Field of Classification Search
USPC .................. 374/102, 107, 108, 106; 166/216
See application file for complete search history.

(56) References Cited

U.S. PATENT DOCUMENTS

| | | | | |
|---|---|---|---|---|
| 3,946,611 A | * | 3/1976 | Larsson | 374/106 |
| 4,038,873 A | * | 8/1977 | Kimmel | G01K 11/06 |
| | | | | 116/206 |
| 4,042,336 A | * | 8/1977 | Larsson | 422/409 |
| 4,276,190 A | * | 6/1981 | Patel | 252/408.1 |
| 4,812,053 A | * | 3/1989 | Bhattacharjee | G01K 3/04 |
| | | | | 116/206 |
| 6,042,264 A | * | 3/2000 | Prusik et al. | 374/106 |

(Continued)

OTHER PUBLICATIONS

Kang, Ji-Hwan, et al., "Thermoresponsive Hydrogel Photonic Crystals by Three-Dimensional Holographic Lithography", Advanced Materials, (2008), pp. 3061-3065, vol. 20.

(Continued)

*Primary Examiner* — Mirellys Jagan
(74) *Attorney, Agent, or Firm* — Nath, Goldberg & Meyer; Jerald L. Meyer; Stanley N. Protigal (57) ABSTRACT

A time-temperature indicator (TTI) uses polymer hardening properties to "set" or retain indications of temperature history. The TTI includes a mesh layer affixed to a thermo-conductive adhesive layer and a photonic crystal patterned film affixed to the mesh layer. The photonic crystal shows a property of bandgap shift vs temperature and responds to a predetermined range of temperatures to provide a visible indication of the range of temperatures. A hardener pouch is affixed to one end of the mesh layer and releases hardener in response to an initiating event, so that the photonic crystal material responds to the hardener by presenting a fixed state.

14 Claims, 5 Drawing Sheets

(56) References Cited

U.S. PATENT DOCUMENTS

| | | | |
|---|---|---|---|
| 6,224,000 B1 * | 5/2001 | Wang .................... | A62C 31/03 |
| | | | 239/390 |
| 6,244,208 B1 * | 6/2001 | Qiu ......................... | G01K 3/04 |
| | | | 116/207 |
| 6,741,523 B1 * | 5/2004 | Bommarito et al. ......... | 368/327 |
| 2003/0214997 A1 * | 11/2003 | Diekmann et al. .......... | 374/102 |
| 2004/0240324 A1 * | 12/2004 | Isbitsky et al. ............... | 368/327 |
| 2009/0010304 A1 * | 1/2009 | Skinner et al. ............... | 374/102 |
| 2012/0044970 A1 * | 2/2012 | Arsenault ..................... | 374/159 |
| 2012/0079981 A1 * | 4/2012 | Huffman et al. ............. | 116/207 |
| 2012/0236900 A1 * | 9/2012 | Hubbard et al. ............. | 374/102 |
| 2014/0092464 A1 * | 4/2014 | Arsenault et al. ........... | 359/290 |

OTHER PUBLICATIONS

Debord, J. D. et al., "Thermoresponsive Photonic Crystals", The Journal of Physical Chemistry B, (Jul. 13, 2000), pp. 6327-6331, vol. 104, No. 27.

O' Lenick, T.G., et al. "Thermosensitive Aqueous Gels with Tunable Sol-Gel Transition Temperatures from Thermo- and pH-Responsive Hydrophilic ABA Triblock Copolymer", Langmuir Article, American Chemical Society (Jan. 25, 2010), pp. 8787-8796, vol. 26.

* cited by examiner

TIME TEMPERATURE INDICATOR BY CHROMATOGRAPHY AND PHOTONIC LATTICE CHANGES

RELATED APPLICATION

The present Patent Application claims priority to Provisional Patent Application No. 61/630,480 filed Dec. 13, 2011, which is assigned to the assignee hereof and filed by the inventor hereof and which is incorporated by reference herein.

BACKGROUND

Field

The present disclosure relates to time-temperature indicators (TTI), and to time-temperature indicators displaying an indication of temperature records over time.

Background

The following show some of the TTI available either in the commercial market or being described in literature. The operational principles of various TTI products are briefly described:

Diffusion-Based TTI

A diffusion-based TTI relies on diffusion of reactive components, in which the diffusion is time and temperature dependent. An example of a diffusion-based TTI is Monitor Mark® TTI, commercialized by the 3 M Company, based on the temperature-dependent diffusion reaction of a colored fatty acid ester along a porous wick made of high-quality blotting paper. Its measurable response is the distance of the advancing diffusion front from the origin (Kerry et al., 2006).

Red-ox Dye

Hu and Loconti (1973) and Gohil (2006) have reported a receptacle that contained a metered amount of oxidized red-ox dye and an effective amount of reducing agent in an alkaline medium, solvent or moisture retainer. The conversion of the oxidized red-ox dye into its reduced form occurs inside the sealed receptacle. The color change can also come from the oxygen diffusing through the barrier film and react with the reduced dye.

Lewis (2002) developed a time indicator that consists of a tissue paper saturated with reduced dye and covered with a plastic cap. The oxygen diffuses through the plastic cap that leads to a color change from the oxidation of the dye. The plastic cap is thick in the center and gradually thins outward toward the edge. This construction provides a gradual color transition from the edge to the center with the elapse of time.

Color Change as a Result of Solid State Polymerization of Substituted Monomers

Polymer-based systems such as the Fresh Check® TTI produced by the company TempTime, are based on the solid state polymerization of a thinly coated colorless acetylenic monomer that changes to a highly colored opaque polymer at a temperature-dependent rate (Nuin et al., 2008).

Based on Time-Temperature Dependence of Enzymatic Reaction (Vitsab®) Leak & Rönnow, 2000

Enzymatic systems such as the VITSAB Check Point® TTI are based on a color change in the TTI induced by a pH drop resulting from the controlled enzymatic hydrolysis of a lipid substrate which changes the color of the chromatic indicator from green over yellow to orange red (Kerry et al., 2006; Tsironi et al., 2008).

A plastic outer compartment contains two mini-pouches; one contains a water solution of lipolytic enzyme, and the other is lipid substrate water solution containing a pH indicator. The TTI is activated by breaking the wall between two mini-pouches and the contents are mixed by outside force. A color change from green to clear yellow is due to the controlled enzymatic hydrolysis of a lipid substrate with a decrease in pH.

Alternative enzymatic systems have been described. Sun et al. (2008) developed a new amylase type TTI based on the reaction between amylase and starch. Bauer and Knorr (2005) reported a pressure induced starch gelation as a pressure time temperature indicator (PTTI).

Solid State Reaction Systems

Solid state reaction systems represented by the OnVu™ TTI produced by the Ciba company are based on photosensitive compounds such as benzylpyridines. Once exposed to a low wavelength light, they become colored and this colored state reverses to the initial colorless state according to temperature (Tsironi et al., 2008). The OnVuÒ (2006) time-temperature indicator from Ciba Specialty Chemicals and Fresh Point relies on the properties of pigments that change color over time and temperature. The OnVuÒ is activated by UV light to first become dark blue and then gradually changes to light color as time passes.

Microbiological TTIs

Microbiological TTIs are proposed by the French company CRYOLOG. TRACEO® and (eO)® are microbiological TTIs made of selected strains of lactic acid bacteria. Prior to utilization, these TTIs are stored in a frozen state (−18° C.) to prevent bacterial growth in the TTI medium. As these TTIs are very thin, their activation is obtained simply by defrosting them for a few minutes at the room temperature. The TTIs are put on the food, and in case of temperature abuse or when the product reaches its "use-by" date, the temperature-dependent growth of the TTI microorganisms causes a pH drop in the tags, thereby leading to an irreversible color change of the medium chromatic indicator which becomes red (Ellouze et al., 2008).

SUMMARY

A time-temperature indicator (TTI) is provided on a substrate or thermo-conductive adhesive layer. A mesh layer affixed to the substrate and a photonic crystal patterned layer is affixed to the mesh layer. The photonic crystal patterned film comprises a photonic crystal material, which shows a property of bandgap shift vs temperature and thereby responds to a predetermined range of temperatures to provide a visible indication of the range of temperatures. A hardener pouch is affixed to one end of the mesh layer and releases hardener in response to an initiating event. The photonic crystal material responds to the hardener by going to a fixed state.

BRIEF DESCRIPTION OF THE DRAWINGS

The file of this patent contains at least one drawing executed in color. Copies of this patent with color drawings will be provided by the Office upon request and payment of the necessary fee.

FIGS. 3A, 3B and 3C are graphs depicting reflectance of central peak reflected by photonic lattice of 80 layers (FIG.

3A), 40 layers (FIG. 3B) and 10 layers (FIG. 3C) of different correction factors representing lattice change.

DETAILED DESCRIPTION

Time-temperature indicator (TTI) technology is used in active packaging in food control. It can be used on individual food products for which the shelf life can be extended substantially, so long as the food's unique spoilage mechanisms are understood and controlled. Time-temperature indicators are reliable, accurate, easily reproducible, easy to apply/activate and storable at room temperature. Time-temperature indicators are cost-effective enough to be included on each individual package without materially affecting the retail price of the product.

The use of TTIs leads to increased brand loyalty and enhanced reputation by providing a significantly better product freshness indication than a "sell-by" date. TTIs increase consumer safety and convenience, can be configured to be safe for indirect food contact and can be easy for the consumer to understand and use.

A food product's chill chain is food management technique by which the continuity or disruption of protected conditions under which the food product is maintained prior to use. Typically this includes the maintenance of temperatures within satisfactory limits; however in many cases, lower temperatures are presumed to further extend shelf life. Time-temperature indicator technology gives a visual summary of a product's accumulated chill chain history, recording the effects of both time and temperature. By providing essential information on chill chain history, TTIs also help optimize shelf life, since suppliers and retailers will no longer need to discard products prematurely to cover for potential spoilage, caused, for example, by incorrect storage.

Possible applications for TTIs are as follows.

Medical Use

Transportation conditions of medical or biological agents such as vaccines, blood are critical to minimize fatal effects due to adverse conditions (e.g. bacteria growth, protein destruction). The American Association of Blood Banks and US Food and Drug Administration (FDA) require human blood or components to be stored at 1° C. to 6° C. and not to exceed 10° C. when transported. In day-to-day operations, transfusion services typically manage this function according to the 30-minute rule, which requires refrigerated blood components be held at ambient temperature for no longer than 30 minutes. Currently, the temperature-sensitive labels being used alert transfusion services if the temperature of blood bags exceeds 10° C.

Food and Beverage Supply Chain & Packaging

The World Health Organization regulates the use of TTIs for certain medical products. There is extensive regulation by the FDA on the use of TTIs on US seafood products. To the degree that the changes in the indicator match the degradation rate of the food, the indicator can help indicate probable food degradation. A number of European Union projects such as "Fresh label" and "Chill-on" have successfully tested different time temperature indicators and their use on different food products.

An increasingly complex global supply chain allows consumers to buy fresh produce, dairy and meat products from virtually anywhere. However, these sensitive products are often subject to variations in temperature during shipment and non-standardized, non-continuous methods of control throughout the chill-chain. Supplied either as printing inks or labels, TTIs can be used for any product that is sensitive to temperature, especially meat, dairy and produce. Every indicator can be tailored to the shelf life and optimum storage conditions of the specific product it is designed to monitor. Time-temperature indicators allow producers, retailers and consumers to check at a glance whether perishable products have been correctly stored and supplied.

Scientific Research

Under advanced research environments, adverse conditions such as ultra high vacuum, cryogenic, dangerous gas or electromagnetic wave applications pose difficulties with in-situ temperature measurement using electronic devices. In such an enclosed chamber, a thermocouple is usually connected to readout electronics in atmospheric environment for data collection. The thermocouple and readout electronics are usually connected through the inlet or specially designed sealing. The problem is that the surface temperature of the sample under test or fabrication cannot be monitored in a precise manner and substantial temperature offset is observed. Thus, the mechanical and electronic connections for temperature monitoring in each system have to be custom designed which further increase instrumentation cost.

A passive photonic crystal time-temperature indicator (PC-TTI) tape, being inert to most of the adverse environmental conditions, is suitable for continuous temperature recording offline. The recorded temperature profile (1 hour, in a non-limiting example) can be read out by the color change or spectral analyzer offsite. In the semiconductor industry, advanced materials synthesis using thermal annealing requires temperatures over 500° C. and can be close to 1000° C. within a few minutes. With the scaling-up of industrial facilities, measuring temperature uniformity is critical for yield improvement and failure analysis. For example, PC-TTI tape is very useful with the Vibrating Sample Magnetometer for magnetic moment measurement with a small sample size, in which the temperature can be 1.6° K (liquid He) to 325° K. PC-TTI tape can also be used for weather monitoring where electromagnetic interference may affect the electronic readout. In advanced research in which high sensitivity measurement is necessary, for example the Vibrating Sample Magnetometer for magnetic moment measurement with small sample size in which temperature range can be 1.6° K (liquid helium environment) to 325° K, the use of the PC-TTI tape offers an alternative low cost verification of sample temperature.

The presently disclosed technology is implemented with an irreversible photonic crystal based temperature time indicator (TTI) in the form of a thin adhesive strip. The present technology records continuous temperature variation along with continuous timeslot on the strip by physically triggering the timer.

Photonic crystal (PC) is patterned on thin film or flexible substrate. The lattice spacing of the photonic crystal varies with temperature and is frozen by moving hardener (chemical mixture) through a solvent carrier medium (for example, chromatographic paper) which acts as a timer. Depending on the physical dimensions of the strip which indicate the pre-set time, the temperature variation is reflected on the frozen lattice spacing which can be visualized by the naked eye or with a spectral analyzer.

EXAMPLES

The irreversible photonic crystal based TTI (PC-TTI) of the present subject matter is able to provide additional features such as temperature recording continuity and an enhanced generic temperature range (not threshold) as an electronic temperature logger without using an electrical supply.

The current passive TTI labels available in the market is designed specifically for a threshold temperature. Each label provides a distinguished color change upon either a higher or lower temperature of single designated value (e.g. 10° C.). One the other hand, the present PC-TTI, based on the continuous lattice printed on the film, is able to provide continuous temperature recording in designated relative time range.

The PC-TTI is made by regularly modulating refractive index inside a host material, there are numbers of ways to accomplish this feature. The lattice may be formed in any convenient fashion, including, by way of non-limiting examples, by laser interference inside the PC materials, self-assembly nano/micro beads or silver halide. The Photonic crystal material may be any suitable material, including, by way of non-limiting examples, dichromated gelatin, hydrogels (HEMA based, NIPAM based), microgel, sol-gel, photoresist materials. Any suitable hardener may be used, including, by way of non-limiting examples, ethanol, aldehyde solution The carrier for the hardener may be any suitable material, including, by way of non-limiting examples, laminated chromatographic paper, surface modified PDMS with channels for capillary suction of hardener solution.

The use of a physical lattice, rather than a chemical reaction or biological system as in existing technologies, provides further advantages to the PC-TTI. For example, while an inert gas (for redox type) and a coolant (for biological enzyme) can be essential during fabrication process of particular TTIs, no special inert environment is necessary for the production of the disclosed PC-TTI and the ease of fabrication means further reduced costs. Inert gas and coolant is used for those non photonic crystal TTIs, such as those redox type and biological based TTI.

For redox type TTI, the materials are sensitive to the moisture and oxygen presented in air. If the redox reaction initiated during the fabrication process, the final product could potentially become useless. For this reason, these type of TTI should be fabricated under inert gas. Inert gas is used for preventing oxygen in air from reacting with the reduced agent to produce "premature" results for the device.

If a biological enzyme is used for TTIs, enzyme activity should be suppressed during fabrication by preparing at low temperature. If the activity is not suppressed during fabrication, the product may be falsely express product aging before use. In a "worst case scenario", the enzyme is degenerated without notice and the final product will not provide its intended function when in use. The coolant is needed for the prevention of denature or deterioration of the enzyme at high or even moderate temperature. Accordingly, storage of enzyme should be ≤5° C.

Many of the existing TTI require special storage or activation conditions before use because of their chemical or biological bases. The ability to provide atmospheric storage of the PC-TTI prior to use provides significant convenience for product packaging. The disclosed PC-TTI varies the reflected color with the temperature by physical or dimension change in the structure. Color (or lattice space) is fixed only when the hardener diffuses into PC medium and fixes the structure. Because the PC medium is separated from the hardener before initiation and both the PC medium and the hardener is stable in atmospheric and room temperature ambient, the product can be stored at normal condition.

In comparison with an electronic temperature logger, the PC-TTI provides an on-site, electricity-free option for continuous temperature recording which is cost-effective, robust to electromagnetic wave interference and light weight. The printed label is also easily integrated with printed barcodes for product information extraction.

Fabrication of PC-TTI

Figure 8:
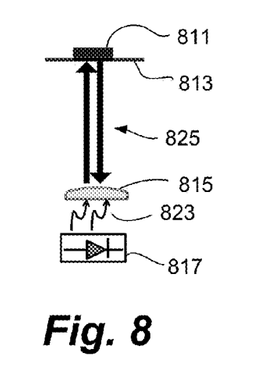
FIG. 8 is a diagram showing an example of photonic crystal patterning using a coherent light source.

Photonic crystals on polymer are fabricated using, for example, coherent light (laser) exposure FIG. 8. Laser exposure with some optical techniques is used to create regular modulated refractive index within the selected materials. The photonic crystals on polymer may be fabricated at room temperature, using, by way of non-limiting example, coherent light (laser) exposure. The TTI, which is based on photonic crystal structure, changes color appearance with temperature. In contrast with other existing TTI systems, which are benchmarked by distinctive threshold temperature, PC-TTI do NOT have a preset temperature threshold; instead the color changes continuously with the external temperature, which provides a continuous history of temperature over time.

Laser exposure creates a photonic crystal structure in the selected materials. Therefore structure/dimension changes of materials with temperature (thermal expansion/phase transition) cause the photonic crystal structure to changes as well. Therefore photonic crystal structure changes the optical appearance and hence related to the temperature changes. The photonic crystal material can be 1-D, 2-D or 3-D structures depending on the application and complication of parameters to be extracted. The selection of the 1-D, 2-D or 3-D structures establish a thermal response characteristic of the photonic crystal material.

Figure 1:
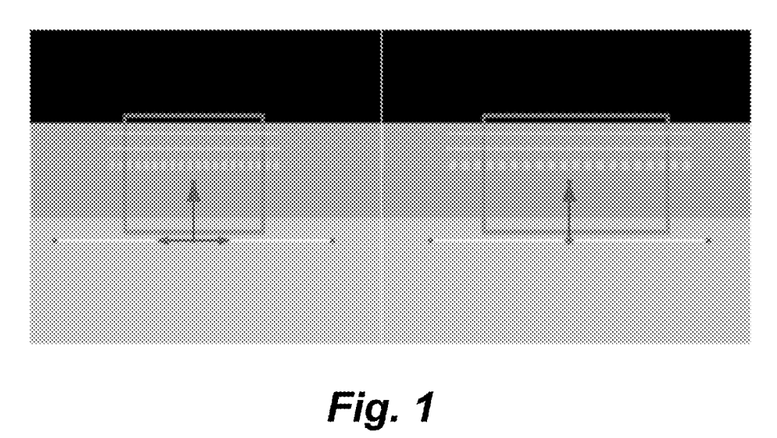
FIG. 1 is a diagram showing a nano-imprint surface pillar embedded in a hardener transfer medium. The left (X-Y) and right (Y-Z) views show light reflection by the upward-facing arrows.

The dimensionality of the 1-D, 2-D or 3-D structures can be understood in that all photonic crystals show thermal sensitive lattice changes. The disclosed technology creates a low cost TTI with ease of fabrication and visual readout. The lattice spacing is in general represented by D here but there are actually more than one lattice spacing in 2-D and 3-D structures that affect the final output spectral response. A diffraction grating is an example of 1D regular refraction index modulation on a material surface which can be made by etching and imprinting. Nano-imprint photonic crystals can also be used for TTI construction. This is depicted in FIG. 1, which shows the nano-imprint surface pillar embedded in the hardener transfer medium. Spacing between columns of pillars (D) changes in response to temperature change (D+/−Δd), which can also be frozen by hardener result in negligible lattice change (Δd→0). In FIG. 1, the left (X-Y) and right (Y-Z) views show light reflection by the upward-facing arrows.

Figure 2:
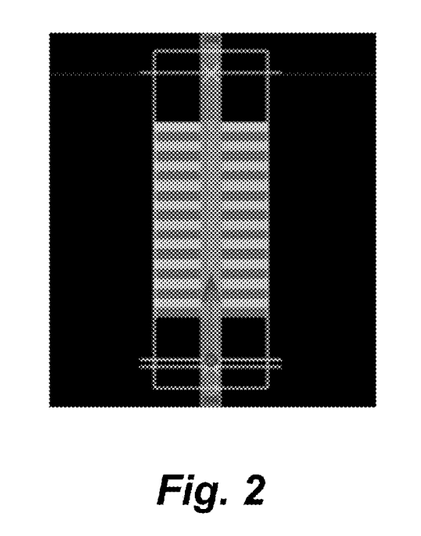
FIG. 2 is a diagram showing a Finite Difference Time Domain (FDTD) simulation of TTI.

A 2-D structure of Finite-Difference-Time-Domain is used to explain the effect of fabrication process using different laser exposure during fabrication. The figure shows a 10 layer photonic crystal cross section with planar light incident through. The reflectance/transmittance characteristic can be recorded FIG. 2 is a diagram showing a Finite Difference Time Domain (FDTD) simulation of TTI. Laser of wavelengths 0.3 um, 0.5 um, 0.7 um, 0.9 um and 1.1 um are used to fabricate photonic crystal on gelatin. The reflectance is measured from the planar surface under different correction factor representing the expansion of lattice.

Figure 3A:
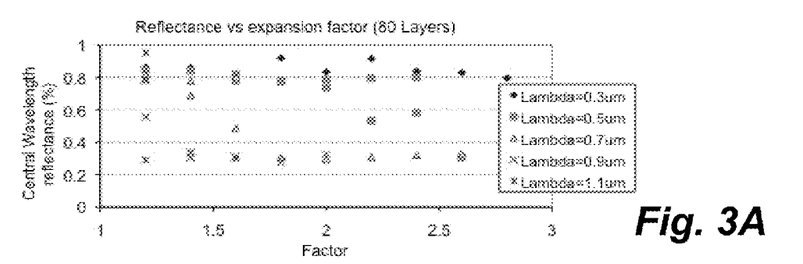
Figure 3B:
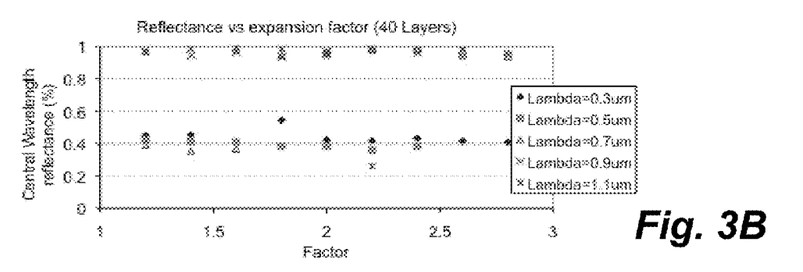
Figure 3C:
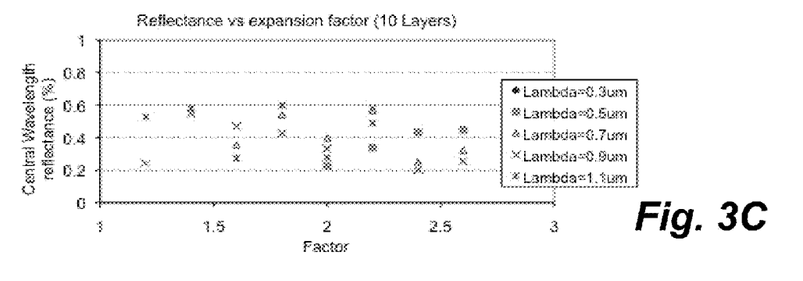
Figure 4:
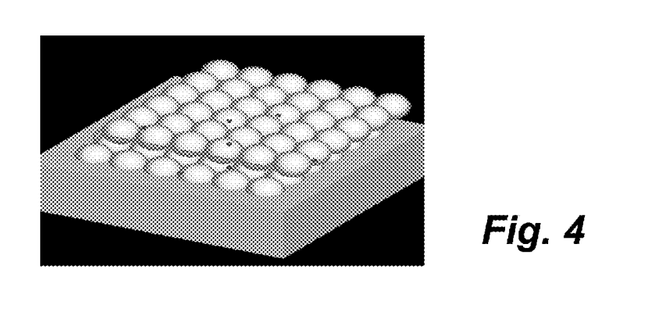
FIG. 4 is a diagram showing a photonic crystal fabricated by micro-gel showing 3-D lattice structure.

FIGS. 3A, 3B and 3C are graphic depictions of reflectance of central peak reflected by photonic lattice of 80 layers (FIG. 3A), 40 layers (FIG. 3B) and 10 layers (FIG. 3C) of different correction factors representing lattice change. Photonic crystal structures can also be obtained by other fabrication methods such as nano-imprinting and etching. The photonic crystal shows a property of bandgap shift vs temperature. These figures show that 0.3 um and 0.5 um fabrication wavelengths are more favorable in 80 layers structure whilst 0.9 um and 1.1 um are more favorable fabrication wavelengths for 40 layers in terms of reflective efficiency. The number of layers can be determined by the laser power and penetration power as well as the transparency of the photo sensitive plate itself Other than laser interference, photonic crystal TTI can also be fabricated by other methods. For example, micro-gel can be fabricated on planar surface and distinctive reflection of color change along with temperatures can be used for TTI foundation. FIG. 4 shows micro-gel 3-D scaffold. The bandgap shift is due to the thermo-initiated volume phase transition by the lattice, which will lead to the change in frequencies of light that can propagate in the crystal.

A photonic crystal patterned film is fixed to the mesh layer and comprises a photonic crystal material. The photonic crystal patterned film contains a photonic crystal material wherein the photonic crystal shows a property of bandgap shift vs. temperature. This enables the photonic crystal material to respond to a predetermined range of temperatures to provide a visible indication of the range of temperatures. For photonic crystal structured materials, color appearance can be shown by adsorption or reflection of a band of wavelength when light pass through the material and recorded by a spectrometer. This feature is characterized as the energy bandgap due to photonic crystal structure presented in the material. When temperature changes, the structural change results in change of energy bandgap that deduces the color appearance of the photonic crystal structured materials.

Figure 9:
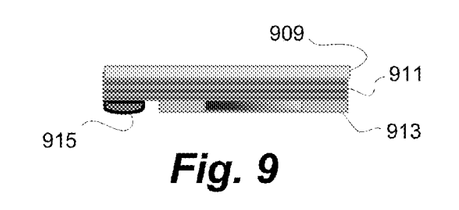
FIG. 9 is a diagram showing functional layers of an example photonic crystal time-temperature indicator (PC-TTI).

The photonic crystal patterned film is encapsulated by thermo-conductive adhesive and chromatographic/diffusive back sheet (FIG. 9). The backsheet is connected to a hardener reservoir (to freeze the lattice spacing).

Figure 10:
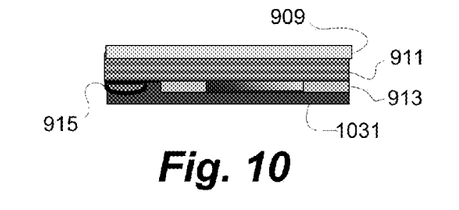
FIG. 10 is a diagram of an example PC-TTI with a protective layer.

An optically transparent protective layer is applied for the ease of viewing and analyzing the TTI, and provides reasonable shelf life (FIG. 10).

Figure 5A:
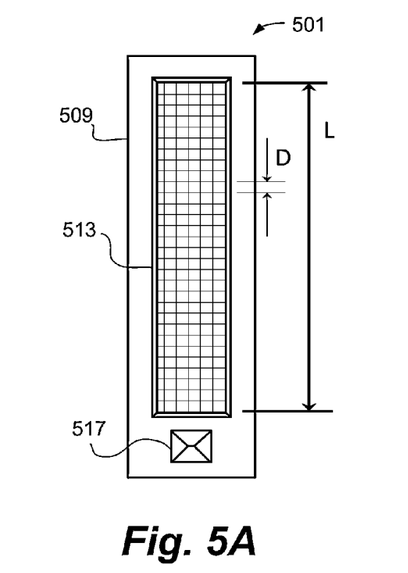
FIG. 5A is a diagram showing an example of photonic crystal patterning using a coherent light source before hardener diffusion.

FIG. 5A is a diagram showing an example of TTI device with photonic crystal structured material. Depicted is a photonic crystal time-temperature indicator (PC-TTI) 501, having diffusive medium 509, photonic crystal film 513 and chemical pouch 517 containing hardener. In FIG. 5A, pouch 517 is unopened, and photonic crystal film 513 dynamically changes in accordance with temperature conditions.

Figure 5B:
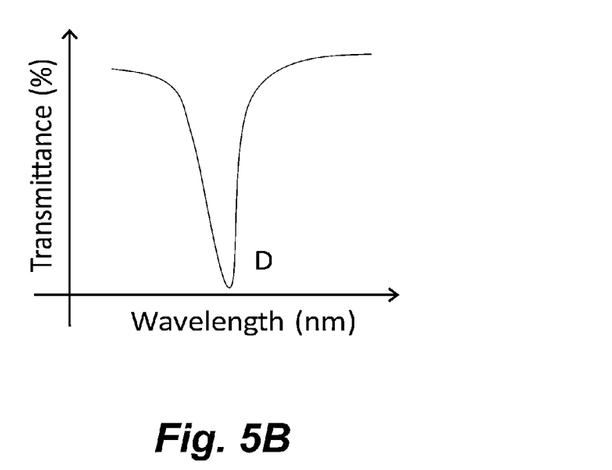
FIG. 5B is a graphic depiction showing transmittance vs. wavelength, corresponding to the example depicted in FIG. 5A.

FIG. 5B is a graphic depiction showing transmittance vs. wavelength, corresponding to the example depicted in FIG. 5A. The figure shows a particular wavelength being transmitted (or reflected) through the stripe under constant D, which is the lattice constant of photonic crystal layers.

Figure 6A:
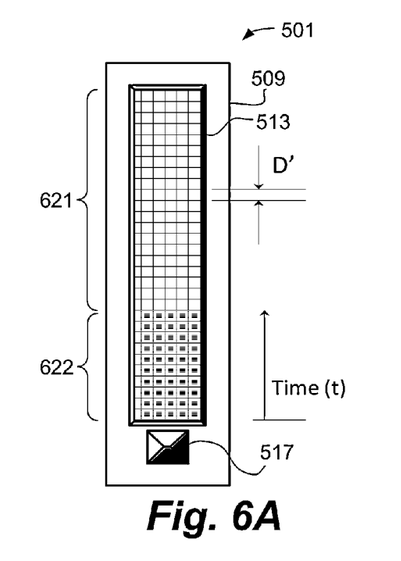
FIG. 6A is a diagram showing an example of photonic crystal patterning using a coherent light source during temperature change and hardener diffusion.

FIG. 6A is a diagram of PC-TTI 501 in its state during a time period of measurement. The diagram shows an example of TTI device with photonic crystal structured material. The fixer/hardener is carried by the chromatographic/diffusion layer after bursting chemical pouch 517. As depicted, a portion 621 of photonic crystal film 513 furthest from chemical pouch 517 is unaffected by the hardener from the burst chemical pouch because the hardener has not migrated to the unaffected area; however, a portion 622 of the photonic crystal film 513 closest to the burst chemical pouch 517 has reacted to the hardener from the pouch 517 and has become fixed. The fixed indication approximates the indication of the photonic crystal film 513 at the time that the hardener migrated to that part of the photonic crystal film.

It is noted that the rate of migration of the hardener may be affected by temperature. In this manner, a PC-TTI exposed to warmer temperatures will show the warmer temperatures in the form of change in appearance of the photonic crystal film in portion 622, but will also show portion 622 extending further from chemical pouch 517 as compared to a TMI which has been subject to colder temperatures. Thus the rate of migration of the hardener and the indication by the photonic crystal film will both indicate the effects of thermal conditions. By way of non-limiting example, if PC-TTI is kept in deep freeze conditions, there would be very little migration of the hardener and therefore portion 622 would increase by a very small extent during the deep freeze conditions.

Figure 6B:
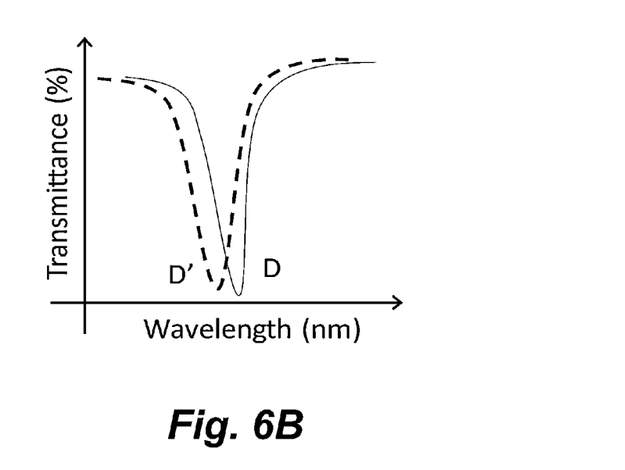
FIG. 6B is a graphic depiction showing transmittance vs. wavelength, corresponding to the example depicted in FIG. 6A.

FIG. 6B is a graphic depiction showing transmittance vs. wavelength, corresponding to the example depicted in FIG. 6A. The figure shows that, once the fixer/hardener diffused to the photonic crystal film, the elasticity of film changes and the lattice (D') is frozen in its state at a particular timeslot. This results in expansion of portion 622, diminishing portion 621.

Figure 7A:
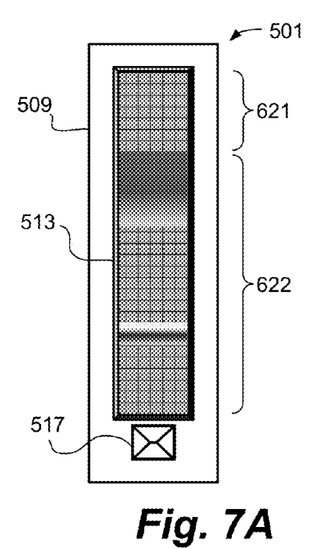
FIG. 7A is a diagram showing an example of photonic crystal patterning using a coherent light source after completion of hardener diffusion.

FIG. 7A is a diagram showing an example of TTI device with photonic crystal structured material. Spectral shift/color change due to temperature change at a particular time slot is recorded on the strip. In the example, the hardener has migrated further from chemical pouch 517, so portion 621 shows current thermal conditions.

Figure 7B:
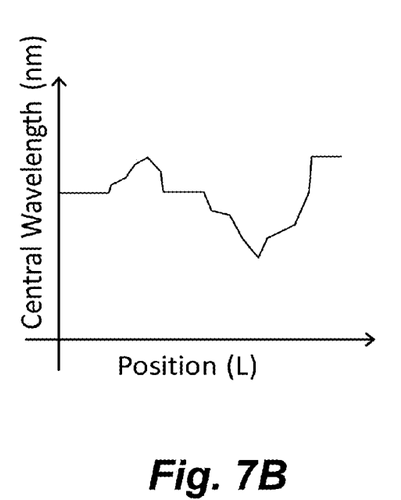
FIG. 7B is a graphic depiction showing wavelength vs. position, corresponding to the example depicted in FIG. 7A.

FIG. 7B is a graphic depiction showing wavelength vs. position, corresponding to the example depicted in FIG. 7A. The figure shows temperature (lower or higher) can be deduced by the central wavelength shift (i.e., to the longer or shorter side) and time can be deduced by runtime of the fixer/hardener.

The design can also be integrated into electronic readout with additional photo sending layer and electronic signal can be received by RF (Radio Frequency) reader or wired probes.

FIG. 8 is a diagram showing an example of photonic crystal patterning using a coherent light source. Depicted are bulk optic elements 811, photosensitive plate or polymer 813, bulk optic elements 815 and a coherent light source 817. Light 823 transmitted from coherent light source 817 passes bulk optic elements 815 and establishes a light path 825 between bulk optic elements 811 and 815.

The fabrication processes of the key component (413) for the PC-TTI device is in accord with FIG. 8. Light frequency from 817 is transmitted through optics element 815 to converge the light (423) onto photosensitive plate 813 to develop/harden it (by crosslinking the polymer in 823). Optic element 811 is the mirror that reflects the light path 825 to produce constructive interference to produce the lattice structure in TTI. Once the photosensitive plate or polymer 813 exposed with coherent light source and further processed, this polymer with PC structure is assembled with other components to form PC-TTI device. Hence PC-TTI is not the same as the photosensitive plate or polymer 813.

FIG. 9 is a diagram showing functional layers of an example PC-TTI. Depicted are a thermo-conductive adhesive base 909, capillary mesh 911, provided as a diffusion mesh, photonic crystal patterned film 913 and hardener pouch 915.

FIG. 10 is a diagram of an example PC-TTI, with protective layer 1031. The protective layer 1031 provides optically transparent detection window and resistance against adverse environmental conditions.

The TTI is intended to be read visually by individual/customer but it is also suitable to be read by imaging in factory or industrial application. Coherent light source (laser) is one of the methods to create photonic crystal pattern, but it is not necessary or required for reading the output of the TTI.

Before the fixer/hardener is applied, the temperature change induced lattice shift ($\Delta d$) is reversible. The whole film shrinks or swells reversibly with a homogeneous color change depending on the external temperature with homogeneous color change.

By carefully designing the lattice constant, it is possible to get readout signal (Reflectance) in visible region with different record lattice constant deduce from temperature change. FDTD (Finite Difference Time Domain) simulation is used to demonstrate gelatin TTI wavelength shifts against lattice change. The photonic crystal is fabricated by 500 nm laser interference. Coherent light source for fabrication is necessary for interference pattern for lattice layer structure. It is also the key for sharp passband that results in sharp color reflectance. For readout, the narrow band reflectance can be readily recognized by the naked eye.

Figure 11:
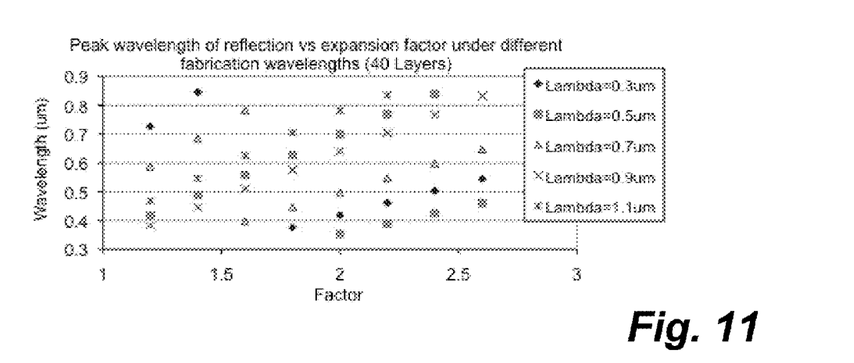
FIG. 11 is a graph showing reflectance wavelength changes through a 40-layer photonic crystal structure with lattice spacing D depicted by different fabrication lambda from 0.3 um to 1.1 um and expansion factor representing temperature change.

FIG. 11 is a graph showing a 40 layers photonic crystal structure with lattice spacing D depicted from fabrication wavelengths 0.3 µm, 0.5 µm, 0.7 µm, 0.9 µm and 1.1 µm. The expansion factor from 1.0 to 2.6 represents lattice expansion due to temperature change. A homogeneous photonic crystal patterned layer is used as a temperature recording medium with lattice spacing D. As depicted in the graph of FIG. 11, when the expansion factor increases, the central wavelength of reflectance shifts to longer wavelengths. There are five different fabrication wavelengths shown in the graph which affect the lattice spacing D. The lattice spacing controls the central wavelength of the original TTI stripe. It also affects the sensitivity of the TTI which is the lattice change, delta D ($\Delta D$), against the temperature change, delta T ($\Delta T$), as show in the slope of the below graph. For certain reflective index and number of reflective layers, there are double peaks may appear for one exposure wavelength that may lead to complicated signal analysis. It is necessary to find the appropriate exposure wavelength in the designated TTI structure for single peak. From the graph, the appropriate exposure wavelength is 0.7 um in the case of 40 layers lattice with reflective index of a gelatin layer.

Figure 12:
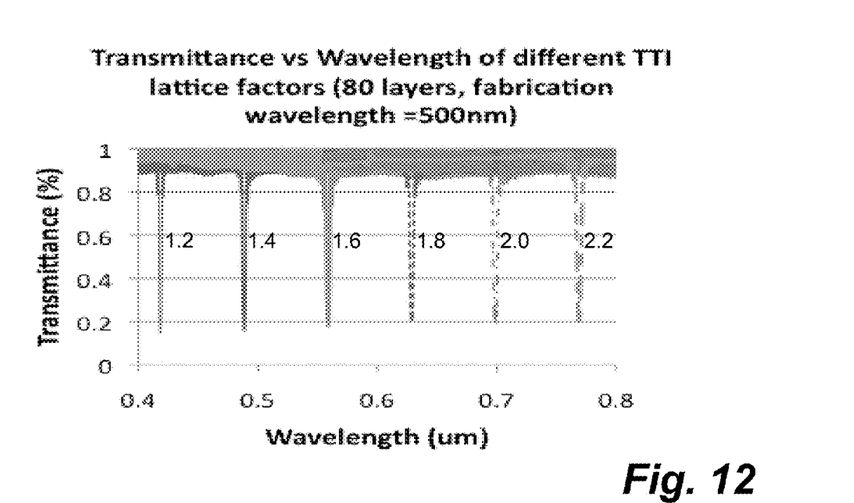
FIG. 12 is a diagram showing a graph output of a simulation for central wavelengths under different lattice correction factors (from 1.2 to 2.2) representing temperature change.

FIG. 12 is a diagram showing a graph output of central reflectance wavelengths for a lattice correction factor (or temperature induced lattice change) from 1.2 to 2.2 under 80 layers photonic layers fabricated by 500 nm coherent light. The simulation reveals the relationship of an eighty layers photonic crystal with original lattice correction factor 1.0. The correction factor from 1.2 to 2.2 in the step of 0.2 represents the lattice change.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A time-temperature indicator (TTI) comprising:
   a substrate;
   a mesh layer affixed to the substrate;
   a photonic crystal patterned film affixed to the mesh layer and comprising a photonic crystal material, wherein the photonic crystal shows a property of bandgap shift vs temperature and thereby responds to a predetermined range of temperatures to provide a visible indication of the range of temperatures, the mesh layer with the photonic crystal material rendering a visual summary of a product's accumulated chill chain history, recording the effects of both time and temperature using pre-set times, and wherein the photonic crystal pattern provides a temperature recording medium with lattice spacing of the photonic crystal pattern, the lattice spacing controlling at least one characteristic of the time and temperature indication by the photonic crystal; and
   a hardener pouch containing a hardener and affixed to one end of the mesh layer and configured to allow release of the hardener in response to an initiating event, so as to dispense the hardener progressively across the patterned film as a function of time, modulated by temperature, progressively recording temperature across the patterned film as a function of time, thereby to provide continuous temperature recording in a designated relative time range to render the visual summary of the product's accumulated chill chain history, wherein the photonic crystal material responds to the hardener by presenting a fixed state.

2. The time-temperature indicator as described in claim 1, wherein the mesh layer has a configuration which permits the hardener to pass the mesh layer as a function of time, thereby progressing along a length of the mesh layer from the hardener pouch, and progressively causes the photonic crystal material to respond to the hardener along said length.

3. The time-temperature indicator as described in claim 1, further comprising the photonic crystal material comprising at least one material selected from 1-D, 2-D or 3-D structures, in order to establish a thermal response characteristic of the photonic crystal material.

4. The time temperature indicator as described in claim 1, wherein the substrate comprises a thermo-conductive adhesive layer fixable to a product, or the packaging of the product, for which time and temperature sensing indicates a corresponding shelf life.

5. The time-temperature indicator as described in claim 1, wherein the visual summary provided by the mesh layer with the photonic crystal material records the effects of both time and temperature using pre-set times, and reflects temperature variation on a frozen lattice spacing providing visualization by the naked eye or with a spectral analyzer.

6. The time-temperature indicator as described in claim 1, further comprising:
the photonic crystal material and hardener recording continuous temperature variation along a continuous timeslot on the strip by physically triggering a timing function, thereby allowing correlation of a temperature effect as a function of temperature over time to provide a correlation with a degradation or other temperature effect as a function of temperature over time.

7. The time-temperature indicator as described in claim 1, further comprising:
the dispensing of the hardener progressively across the patterned film recording continuous temperature variation along a continuous timeslot on the strip by physically triggering a timing function, thereby allowing correlation of a temperature effect as a function of temperature over time to provide a correlation with a degradation or other temperature effect as a function of temperature over time.

8. A method of indicating a time-temperature history of a perishable or time and temperature-sensitive product, the method comprising:
preparing a substrate attachable to the product or to packaging of the product;
fixing a mesh layer to the substrate;
applying a photonic crystal patterned film to the mesh layer comprising a photonic crystal material, wherein the photonic crystal shows a property of bandgap shift vs temperature and thereby responds to a predetermined range of temperatures to provide a visible indication of the range of temperatures, the mesh layer with the photonic crystal material rendering a visual summary of a product's accumulated chill chain history, recording the effects of both time and temperature using pre-set times, and wherein the photonic crystal pattern provides a temperature recording medium with lattice spacing of the photonic crystal pattern, the lattice spacing controlling at least one characteristic of the time and temperature indication by the photonic crystal; and
providing a hardener by dispensing the hardener from one end of the mesh layer and configured to allow release of the hardener in response to an initiating event, so as to dispense the hardener progressively across the patterned film as a function of time, modulated by temperature, progressively recording temperature across the patterned film as a function of time, thereby to provide continuous temperature recording in a designated relative time range to render the visual summary of the product's accumulated chill chain history, wherein the photonic crystal material responds to the hardener by presenting a fixed state.

9. The method of claim 8, further comprising providing the substrate as a thermo-conductive adhesive layer.

10. The method of claim 8, further comprising:
providing the hardener from a hardener pouch mounted so as to dispense the hardener progressively across the patterned film as a function of time, modulated by temperature.

11. The method of claim 8, wherein the visual summary provided by the mesh layer with the photonic crystal material records the effects of both time and temperature using pre-set times, and reflects temperature variation on a frozen lattice spacing providing visualization by the naked eye or with a spectral analyzer.

12. The method of claim 8, wherein the photonic crystal patterned film comprises photonic crystals on a polymer fabricated using laser exposure.

13. A time-temperature indicator (TTI) comprising:
a substrate;
a mesh layer affixed to the substrate;
a photonic crystal patterned film affixed to the mesh layer and comprising a photonic crystal material, wherein the photonic crystal shows a property of bandgap shift vs temperature and thereby responds to a predetermined range of temperatures to provide a visible indication of the range of temperatures, the mesh layer with the photonic crystal material rendering a visual summary of a product's accumulated chill chain history, recording the effects of bath time and temperature using pre-set times, and wherein the photonic crystal pattern provides a temperature recording medium with lattice spacing of the photonic crystal pattern, the lattice spacing controlling at least one characteristic of the time and temperature indication by the photonic crystal; and
a hardener pouch containing a hardener and affixed to one end of the mesh layer and configured to allow release of the hardener in response to an initiating event to render the visual summary of the product's accumulated chill chain history, wherein the photonic crystal material responds to the hardener by presenting a fixed state,
wherein the photonic crystal patterned film comprises photonic crystals on a polymer fabricated using laser exposure.

14. The time-temperature indicator as described in claim 13, wherein:
the photonic crystal material and hardener record continuous temperature variations along a continuous timeslot on the strip by physically triggering a timing function, thereby allowing correlation of a temperature effect as a function of temperature over time to provide a correlation with a degradation or other temperature effect as a function of temperature over time.

* * * * *